Feb. 1, 1972
K. SENNEWALD ET AL  3,639,472
PROCESS FOR THE HYDROLYTIC SPLITTING OF CARBOXYLIC ACID
VINYL ESTERS INTO ACETALDEHYDE AND CARBOXYLIC ACID
Filed March 11, 1969
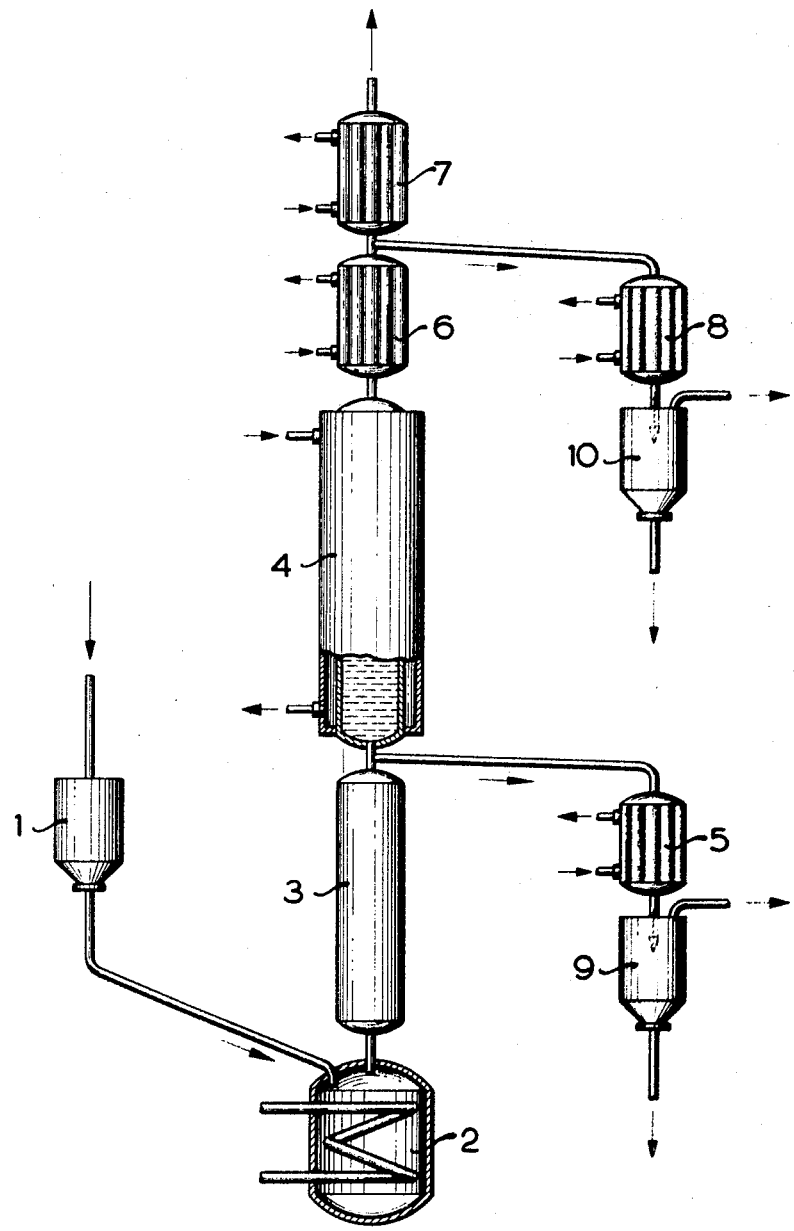
INVENTORS
Kurt Sennewald
Alexander Ohorodnick
Hans-Joachim Hardel
BY *Curtis, Morris & Safford*
THEIR ATTORNEYS

United States Patent Office 3,639,472
Patented Feb. 1, 1972

3,639,472
PROCESS FOR THE HYDROLYTIC SPLITTING OF CARBOXYLIC ACID VINYL ESTERS INTO ACETALDEHYDE AND CARBOXYLIC ACID
Kurt Sennewald, Knapsack, near Cologne, Alexander Ohorodnik, Liblar, and Hans-Joachim Hardel, Bruhl-Vochem, Germany, assignors to Knapsack Aktiengesellschaft, Knapsack, near Cologne, Germany
Filed Mar. 11, 1969, Ser. No. 806,116
Claims priority, application Germany, Mar. 30, 1968, P 17 68 095.4
Int. Cl. C07c 45/00, 51/00
U.S. Cl. 260—541
5 Claims

ABSTRACT OF THE DISCLOSURE

Carboxylic acid vinyl esters are hydrolytically split into acetaldehyde and carboxylic acid in liquid phase, at 50–120° C., and in contact with an organic sulfonic or phosphonic acid and a mercury salt thereof as the catalyst.

It is known that carboxylic acid vinyl esters, particularly vinyl acetate, are accessible to hydrolysis in an acid or alkaline medium. Heretofore, however, it has not been possible for the hydrolysis of vinyl acetate to acetaldehyde and acetic acid to acquire commercial interest as these compounds can be produced by different, more economic methods, and these facts have not materially changed. In connection with a vinyl acetate production process by reaction of ethylene with oxygen and acetic acid, the hydrolysis of vinyl acetate has now unexpectedly been found to be of commercial interest. More particularly, it has been found that the transformation of ethylene into vinyl acetate can be effected with both acetic acid and acetaldehyde, under specific conditions. This possibility opens the way to vinyl acetate production with the use of a single feed material, namely ethylene, and provides special advantages in all those cases in which vinyl acetate shall be produced at a place where merely ethylene is available.

To this end, it is generally customary merely once to use the quantity of acetic acid needed for vinyl acetate production. The resulting vinyl acetate is subjected to hydrolytic splitting into acetic acid and acetaldehyde, which are reacted with ethylene and oxygen to produce twice the quantity of vinyl acetate therefrom. In other words, by the hydrolysis of a vinyl acetate portion to acetaldehyde and acetic acid, and recirculation of the two cleavage products, it is possible to produce vinyl acetate by merely adding ethylene and oxygen. To be applicable, it is necessary for this process that good conversion rates and absence of any by-product formation accompany the vinyl acetate hydrolysis.

In this process, the vinyl acetate to undergo hydrolysis is necessarily obtained in an aqueous, acetic acid solution, in concentrations between about 15 and 40 weight percent. Heretofore, however, it has not been possible by prior art methods to hydrolyze vinyl acetate in liquid phase under conditions that would have justified the production of vinyl acetate merely on the basis of ethylene and oxygen.

It has now unexpectedly been found that vinyl acetate can be hydrolyzed in liquid phase with very good conversion rates and yields given that the hydrolysis is catalyzed by means of a mixture consisting of an organic sulfonic or phosphonic acid and a mercury salt thereof. Hydrolysis tests carried out with pure, organic acids (for example, acetic acid, oxalic acid, trichloroacetic acid) or mineral acids and the corresponding mercury salts have been found to produce much poorer conversion rates and yields, under identical reaction conditions. For example, it has been found that Hg-phosphate and phosphoric acid as the catalyst need reaction times twice as long or produce conversion rates half as good as those needed or obtained in the process of the present invention. Even poorer results are obtained with the use of sulfuric acid and Hg-sulfate.

Carboxylic acid vinyl esters other than vinyl acetate, i.e. esters of which the carboxylate component contains between 2 and 20, preferably between 2 and 4 carbon atoms, can also be subjected to the hydrolytic splitting reaction of the present invention. For example, it is possible to hydrolyze vinyl propionate, butyrate, isobutyrate, isovalerate or benzoate with the resultant formation of acetic acid, propionic acid, butyric acid, isobutyric acid, isovaleric acid or benzoic acid, which are obtained in addition to acetaldehyde.

The present invention relates more particularly to a process for the hydrolytic splitting of carboxylic acid vinyl esters into acetaldehyde and carboxylic acid, which comprises carrying out the hydrolytic splitting reation in the liquid phase, at temperatures between 50 and 120° C. and in contact with a catalyst consisting of an organic sulfonic or phosphonic acid and a mercury salt thereof. The useful sulfonic acids include p-toluene sulfonic acid or benzene sulfonic acid, and the useful phosphonic acids include alkyl phosphonic acids having between 1 and 20 carbon atoms in the alkyl radical, alkenyl or arylphosphonic acids, preferably ethyl or vinylphosphonic acid. Advantageously, the reaction should be carried out in contact with at least 0.1 mol sulfonic or phosphonic acid and at least 0.01 mol of the mercury salt of sulfonic or phosphonic acid, per mol carboxylic acid vinyl ester. It is also advantageous to carry out the reaction in the presence of 0.01 to 0.2 weight percent, based on the quantity of carboxylic acid vinyl esters used, of a polymerization inhibitor, such as phenothiazine, hydroquinone, pyrogallol or p-tert. butyl pyrocatechol. A crude mixture containing between 15 and 40 weight percent vinyl acetate plus acetic acid and water can be used as the carboxylic acid vinyl ester.

The following example illustrate the invention:

EXAMPLE 1

100 grams acetic acid, placed in a round flask with a capacity of 250 milliliters, were mixed with 50 grams p-toluene sulfonic acid (about 0.3 mol) and 16 grams (0.03 mol) Hg-p-toluene sulfonate. The mixture was heated to 118° C. and mixed further with 180 grams/hr. of a vinyl acetate-containing crude mixture composed approximately of: 72 weight percent acetic acid, 22 weight percent vinyl acetate and 6 weight percent water. The material in the base of the flask was maintained at a constant level by distilling off acetaldehyde and acetic acid. Between 85 and 90 percent of the vinyl acetate were split into acetaldehyde and acetic acid; the balance remained unchanged.

The use of equimolar quantities of benzene sulfonic acid and Hg-benzene sulfonate was found to produce the same results, under analogous conditions.

EXAMPLE 2

100 grams acetic acid, placed in a round flask with a capacity of 250 milliliters, were mixed with 32 grams ethyl phosphonic acid (about 0.3 mol) and 12.5 grams (0.03 mol) Hg-ethyl phosphonate. The mixture was heated to 118° C. and mixed further with 180 grams/hr. of a vinyl acetate-containing crude mixture composed approximately of: 72 weight percent acetic acid, 22 weight percent vinyl acetate and 6 weight percent water. The material in the base of the flask was maintained at a constant level by distilling off acetaldehyde and acetic acid. Between 90 and 92 percent of the vinyl acetate used were split into acetaldehyde and acetic acid; the balance remained unchanged.

The use of equimolar quantities of vinyl phosphonic acid and Hg-vinyl phosphonate was found to produce the same results, under analogous conditions.

EXAMPLE 3

A testing apparatus such as that shown in the accompanying drawing was used. 180 grams/hr. of a vinyl acetate-containing crude mixture (about 72 weight percent acetic acid, 22 weight percent vinyl acetate and 6 weight percent water) of the type obtained in vinyl acetate production from ethylene acetic acid and oxygen, were supplied from reservoir 1 to distilling base 2 which was charged once with a catalytically active mixture composed of 50 grams p-toluene sulfonic acid (about 0.3 mol) and 22 grams (0.04 mol) Hg-p-toluene sulfonate, and with 1.5 grams phenothiazine as the polymerization inhibitor.

As described in Example 1, the temperature in the base was maintained at about 118° C. The resulting acetic acid flowing through column 3, which was maintained at a temperature between 111 and 114° C., was condensed in cooler 5 (15° C.) and collected in receiver 9. Acetaldehyde and acetic acid were separated from one another in column 4 and cooler 6 (20° C.). After having been condensed in cooler 7 (+15° C.) and cooler 8 (−15° C.), the pure acetaldehyde was collected in receiver 10.

About 55 kg. vinyl acetate-containing crude mixture were put through the apparatus described above, over prolonged periods. The vinyl acetate conversion rate was between 86 and 93%. Acetaldehyde was obtained in a yield of 97 to 99%, based on the vinyl acetate transformed. The yield of acetic acid was almost quantitative.

We claim:
1. A process which comprises hydrolytically splitting a carboxylic acid vinyl ester selected from the group consisting of vinyl acetate, vinyl propionate, vinyl butyrate, vinyl isobutyrate, vinyl isovalerate and vinyl benzoate, into acetaldehyde and the corresponding carboxylic acid in the liquid phase, at a temperature between 50 and 120° C. and in contact with a catalytically active mixture of (a) a member selected from the group consisting of p-toluene sulfonic acid, benzene sulfonic acid, ethyl phosphonic acid and vinyl phosphonic acid, and (b) a mercury salt thereof.

2. The process of claim 1, wherein the hydrolytic splitting reaction is carried out in a reaction zone in contact with at least 0.1 mol of Component A and at least 0.01 mol of Component B per mol of the said carboxylic acid vinyl ester passed through the reaction zone per hour.

3. The process of claim 1, wherein the hydrolytic splitting reaction is carried out in a reaction zone in contact with 0.01 to 0.2 weight percent, based on the said carboxylic acid vinyl ester passed through the reaction zone per hour, of a polymerization inhibitor selected from the group consisting of phenothiazine, hydroquinone, pyrogallol and p-tert.-butyl pyrocatechol.

4. The process of claim 1, wherein the initial ester is vinyl acetate.

5. The process of claim 1, wherein the carboxylic acid vinyl ester is a crude mixture containing between 15 and 40 weight percent vinyl acetate plus acetic acid and water.

References Cited

UNITED STATES PATENTS

| 2,391,219 | 12/1945 | Bartlett | 260—541 |
| 2,511,467 | 6/1950 | Gresham | 260—540 |
| 2,629,713 | 2/1953 | Goebel | 260—541 |

JAMES A. PATTEN, Primary Examiner

V. GARNER, Assistant Examiner

U.S. Cl. X.R.

260—415, 416, 497 R, 515 R, 540, 601 R